US011840219B2

(12) United States Patent
Lee et al.

(10) Patent No.: US 11,840,219 B2
(45) Date of Patent: Dec. 12, 2023

(54) METHOD FOR CONTROLLING VEHICLE THROUGH MULTI SOC SYSTEM

(71) Applicant: LG Electronics Inc., Seoul (KR)

(72) Inventors: Namsu Lee, Seoul (KR); Seongmin Kim, Seoul (KR); Jaeho Choi, Seoul (KR); Sangwoo Han, Seoul (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 17/312,265

(22) PCT Filed: Jan. 9, 2019

(86) PCT No.: PCT/KR2019/000324
§ 371 (c)(1),
(2) Date: Jun. 9, 2021

(87) PCT Pub. No.: WO2020/145432
PCT Pub. Date: Jul. 16, 2020

(65) Prior Publication Data
US 2022/0032904 A1 Feb. 3, 2022

(51) Int. Cl.
*B60W 30/08* (2012.01)
*H04L 12/40* (2006.01)

(52) U.S. Cl.
CPC .......... *B60W 30/08* (2013.01); *H04L 12/40* (2013.01); *B60W 2552/53* (2020.02); *B60W 2554/4045* (2020.02); *H04L 2012/40215* (2013.01)

(58) Field of Classification Search
CPC ...... B60W 2552/53; B60W 2554/4045; H04L 12/40; H04L 2012/40215; G06F 9/45558; B60R 16/0231

USPC .......................................................... 701/45
See application file for complete search history.

(56) References Cited

U.S. PATENT DOCUMENTS 9,628,787 B2 * 4/2017 Gulati .................. H04N 17/002
10,235,211 B2 * 3/2019 Goyal ................... G06F 9/5077
11,148,675 B2 * 10/2021 Chu ...................... G07C 5/0808
11,433,809 B2 * 9/2022 Lu .......................... G06V 20/56
(Continued)

FOREIGN PATENT DOCUMENTS

CN 108162977 6/2018
EP 3153875 A1 * 4/2017 ............. G01S 13/42
(Continued)

OTHER PUBLICATIONS

Milos et al., "Multi-SoC Load Balancing System for ADAS Application," 2017, Publisher: IEEE.*
(Continued)

*Primary Examiner* — Tuan C To
(74) *Attorney, Agent, or Firm* — Fish & Richardson P.C.

(57) ABSTRACT

Proposed is a method for controlling a vehicle through a multi System on Chip (SoC) system. Specifically, proposed is a method for controlling a vehicle, the method comprising the steps of: by means of a first SoC, requesting information to a second SoC or an Adaptive Driver Assistant System (ADAS); by means of the first SoC, receiving the information from the second SoC or the ADAS as a response to the request; by means of the first SoC, determining whether a vehicle is safe or not by using the received information; and by means of the first SoC, transmitting a command generated on the basis of the determination to the second SoC or the ADAS.

10 Claims, 20 Drawing Sheets

(56) References Cited

U.S. PATENT DOCUMENTS

| | | | |
|---|---|---|---|
| 11,554,727 B2* | 1/2023 | Vaid | H04N 23/60 |
| 11,588,999 B2* | 2/2023 | Vaid | H04N 7/102 |
| 2014/0139670 A1* | 5/2014 | Kesavan | B60W 50/0098 |
| | | | 348/148 |
| 2017/0039084 A1* | 2/2017 | Atsmon | H04L 67/12 |
| 2017/0223306 A1* | 8/2017 | Lu | H04N 23/63 |
| 2018/0062988 A1* | 3/2018 | Sikaria | H04L 12/4633 |
| 2018/0145921 A1* | 5/2018 | Gupta | H04L 67/04 |
| 2018/0284267 A1 | 10/2018 | Maisel | |
| 2019/0043354 A1* | 2/2019 | Oluwafemi | H04L 67/12 |
| 2019/0163989 A1* | 5/2019 | Guo | G06F 18/251 |
| 2023/0036117 A1* | 2/2023 | Krishnani | G06F 21/81 |

FOREIGN PATENT DOCUMENTS

| | | | |
|---|---|---|---|
| KR | 101071061 | 10/2011 | |
| WO | WO-2009149160 A1 * | 12/2009 | G01R 31/318555 |

OTHER PUBLICATIONS

Jiri et al., "Integrated probabilistic approach to environmental perception with self-diagnosis capability for advanced driver assistance systems," 2009, Publisher: IEEE.*
Shashank et al., "Trends in Camera Based Automotive Driver Assistance Systems (ADAS)," 2014, Publisher: IEEE.*
PCT International Search Report and Written Opinion in International Appln. No. PCT/KR2019/000324, dated Oct. 7, 2019, 16 pages (with English translation).

* cited by examiner

FIG. 1
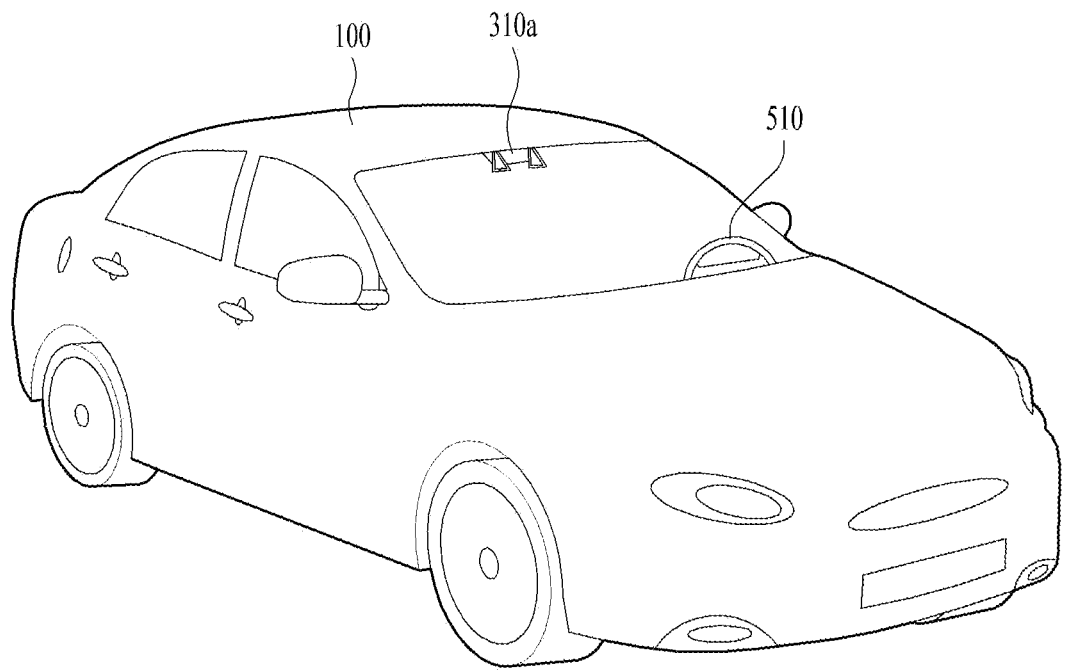
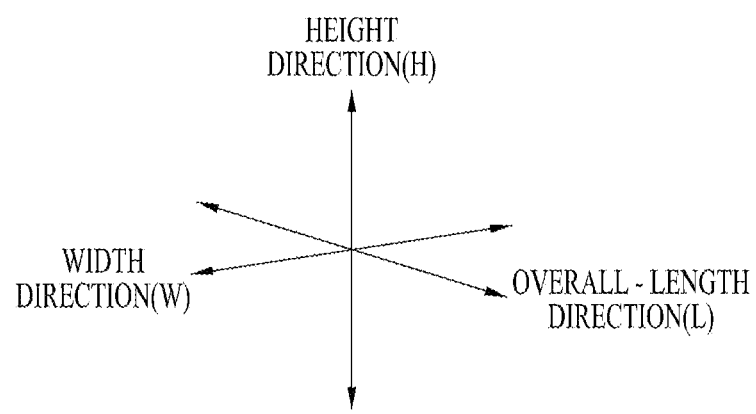

METHOD FOR CONTROLLING VEHICLE THROUGH MULTI SOC SYSTEM

CROSS-REFERENCE TO RELATED APPLICATIONS

This application is a National Stage application under 35 U.S.C. § 371 of International Application No. PCT/KR2019/000324, filed on Jan. 9, 2019, the disclosure of which is incorporated by reference in its entirety.

TECHNICAL FIELD

The present disclosure relates to a method of controlling a vehicle by a multi-system-on-chip (multi-SoC) system, and more particularly, to a method of controlling a vehicle by combining information generated from a central information display (CID) SoC with information generated from an advanced driver assistance system (ADAS) SoC.

BACKGROUND

Although a vehicle traditionally functions as a transportation means for a user, the vehicle is now equipped with various sensors and electronic devices to offer driving convenience to the user. Particularly, an advanced driver assistance system (ADAS) and an autonomous driving vehicle are under active development, for the driving convenience of users.

The recent ADASs and autonomous driving vehicles provide various display devices, for the convenience of a passenger as well as the driving convenience of a user. The display devices are also called in-car entertainment (ICE) or in-vehicle infotainment (IVI). The ICE or the IVI may refer to automotive hardware and software that provide audio or video entertainment. Particularly, the IVI includes an automotive navigation system, a video player, universal serial bus (USB) and Bluetooth connections, Carputers, an in-vehicle Internet, and wireless fidelity (WiFi).

Existing ADASs and autonomous driving vehicles simply provide a driver with information obtained from a sensor through one electronic control unit (ECU) or perform a vehicle control operation according to a preset condition.

SUMMARY

To solve the above problem of the existing ADASs and autonomous driving vehicles, an aspect of the present disclosure is to provide a method of controlling a vehicle by a multi-system-on-chip (multi-SoC) system.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of controlling a vehicle in a multi-system-on-chip (multi-SoC) system includes requesting information to a second SoC or an advanced driver assistance system (ADAS) by a first SoC, receiving the information from the second SoC or the ADAS in response to the request, by the first SoC, determining whether the vehicle is safe based on the received information by the first SoC, and transmitting a command generated based on the determination to the second SoC or the ADAS by the first SoC.

The first SoC and the second SoC may be connected to each other through peripheral component interconnect express (PCIe), and the first SoC and the ADAS may be connected to each other through a control area network (CAN).

The data packet used for the information request and reception may include command, payload length, number of elements, data payload, and end character, and the size of the data payload may vary according to a data type related to the requested and received information.

When the first SoC fails to receive the information for a specific time or longer from the second SoC or the ADAS, the first SoC may transmit a message indicating that the request of the information is valid to the second SoC or the ADAS.

When determining that the safety of the vehicle is at or below a specific level, the first SoC may transmit, to the second SoC, a message indicating that the safety of the vehicle is at or below the specific level, and the second SoC may output the received message on a display device connected to the second SoC.

The method may further include detecting that the vehicle is disconnected from a network by the second SoC, requesting information about a position, speed, and driving lane of the vehicle to the first SoC by the second SoC, and receiving the information about the position, speed, and driving lane of the vehicle from the first SoC in response to the request by the second SoC.

According to one aspect of the present disclosure, a risk may be predicted by combining advanced driver assistant system (ADAS) information and navigation information, and an accident may be avoided according to the prediction result. Further, even when a central information display (CID) is overloaded, a safety-related operation may be maintained in real time. Further, even when a vehicle is disconnected from a network, the CID may actively cope with the network disconnection. Further, as an ADAS SoC combines information in real time through peripheral component interconnect express (PCIe) communication based on a real-time operating system (RTOS) and controlling the vehicle based on the combined information, the vehicle may actively handle a risk.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 1 is a diagram illustrating the exterior of a vehicle according to an aspect of the present disclosure.

DETAILED DESCRIPTION

Figure 2:
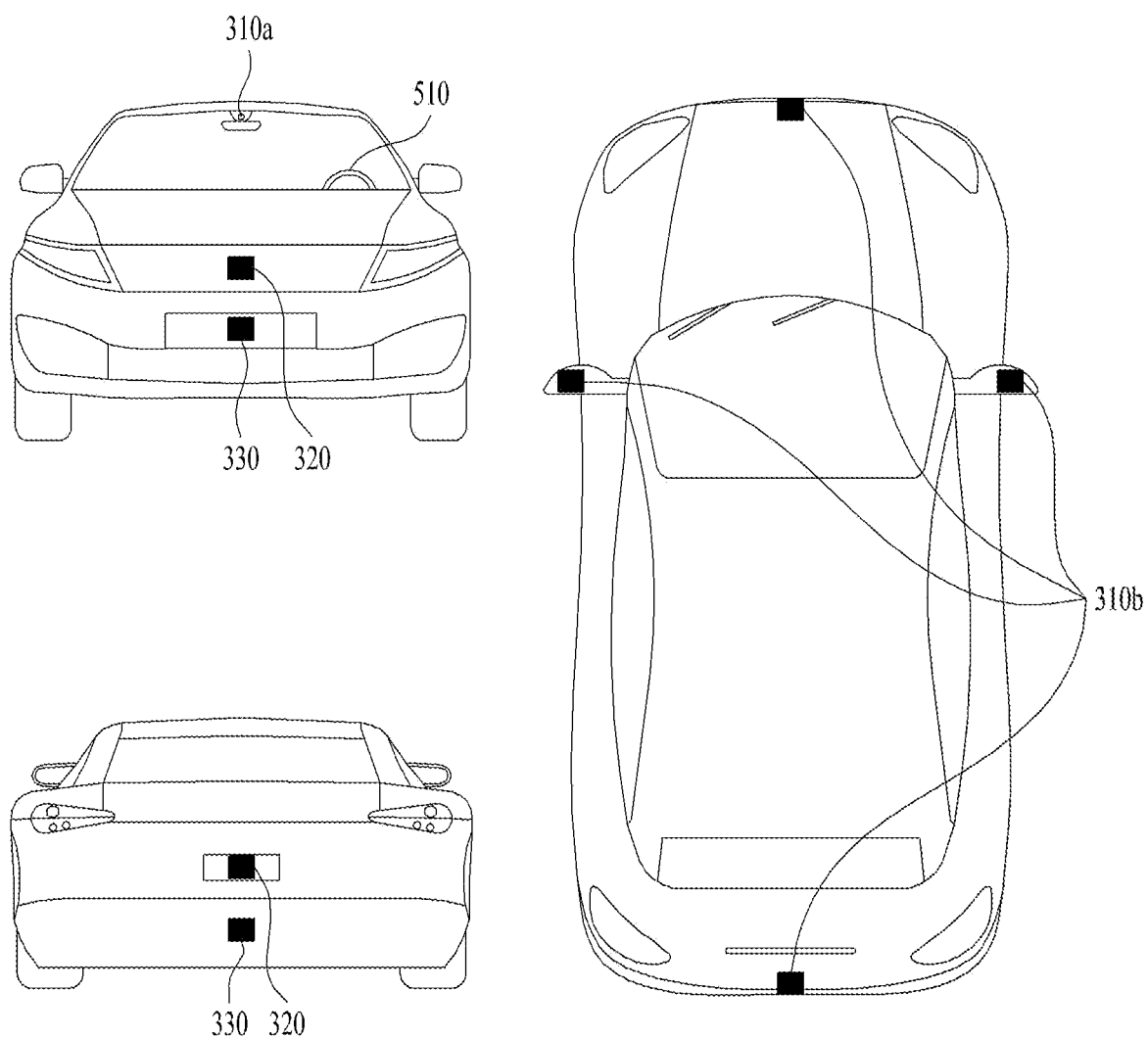
FIG. 2 is a diagram illustrating the exteriors of a vehicle viewed from various angles according to an aspect of the present disclosure.

Embodiments of the present disclosure will be described below in detail with reference to the attached drawings. Like reference numerals denote the same components throughout the drawings, and a redundant description of the components will be avoided. The term "module" and "-or (er)" used to name a component are given or used interchangeably in consideration of only the ease of description, and do not have meanings or roles that are distinguished from each other. A detailed description of a generally known function or structure of the disclosure will be avoided lest it should obscure the subject matter of the disclosure. The attached drawings are provided only to help the understanding of the embodiments of the present disclosure. They are not intended to limit the technological features set forth herein to particular embodiments and include various changes, equivalents, or replacements for a corresponding embodiment.

Ordinal numbers such as 1st, 2nd, first, and second may be used to describe various elements, but the elements are not limited by the terms. The above terms are used only for the purpose of distinguishing one component from another component.

When it is said that a component is "connected" or "coupled" to another component, this may means that the component is directly connected or connected to the other component, but a third component may exist in the middle. On the other hand, when it is said that a component is "directly connected" or "directly coupled" to another component, is may imply that there is no other component between the two components.

Unless otherwise dictated contextually, a singular expression includes plural referents. The term "comprise" or "have" is intended to designate the presence of a feature, a number, a step, an operation, a component, a part, or a combination thereof, not excluding the possibility of the presence or addition of one or more other features, numbers, steps, operations, components, parts, or combinations thereof.

In concept, a vehicle described in the present disclosure may cover a car and a motorcycle. The following description will be given in the context of a car as a vehicle. The vehicle described in the present disclosure may be a concept including all of an internal combustion engine vehicle including an engine as a power source, a hybrid vehicle including an engine and an electric motor as a power source, and an electric vehicle including an electric motor as a power source. In the following description, the left of the vehicle means the left side of a vehicle driving direction, and the right of the vehicle means the right side of the vehicle driving direction.

FIG. 1 is a diagram illustrating the exterior of a vehicle according to an aspect of the present disclosure.

FIG. 2 is a diagram illustrating the exteriors of a vehicle viewed from various angles according to an aspect of the present disclosure.

Figure 3:
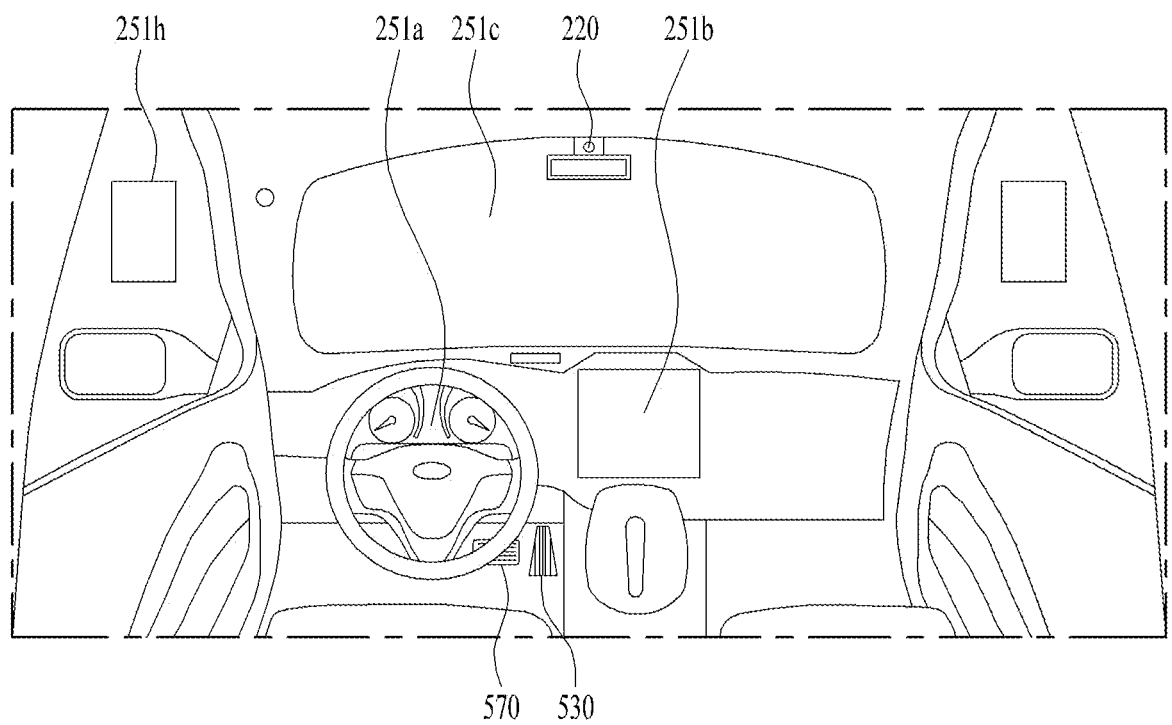
FIG. 3 and FIG. 4 are diagrams illustrating the interior of a vehicle according to an aspect of the present disclosure.
Figure 4:
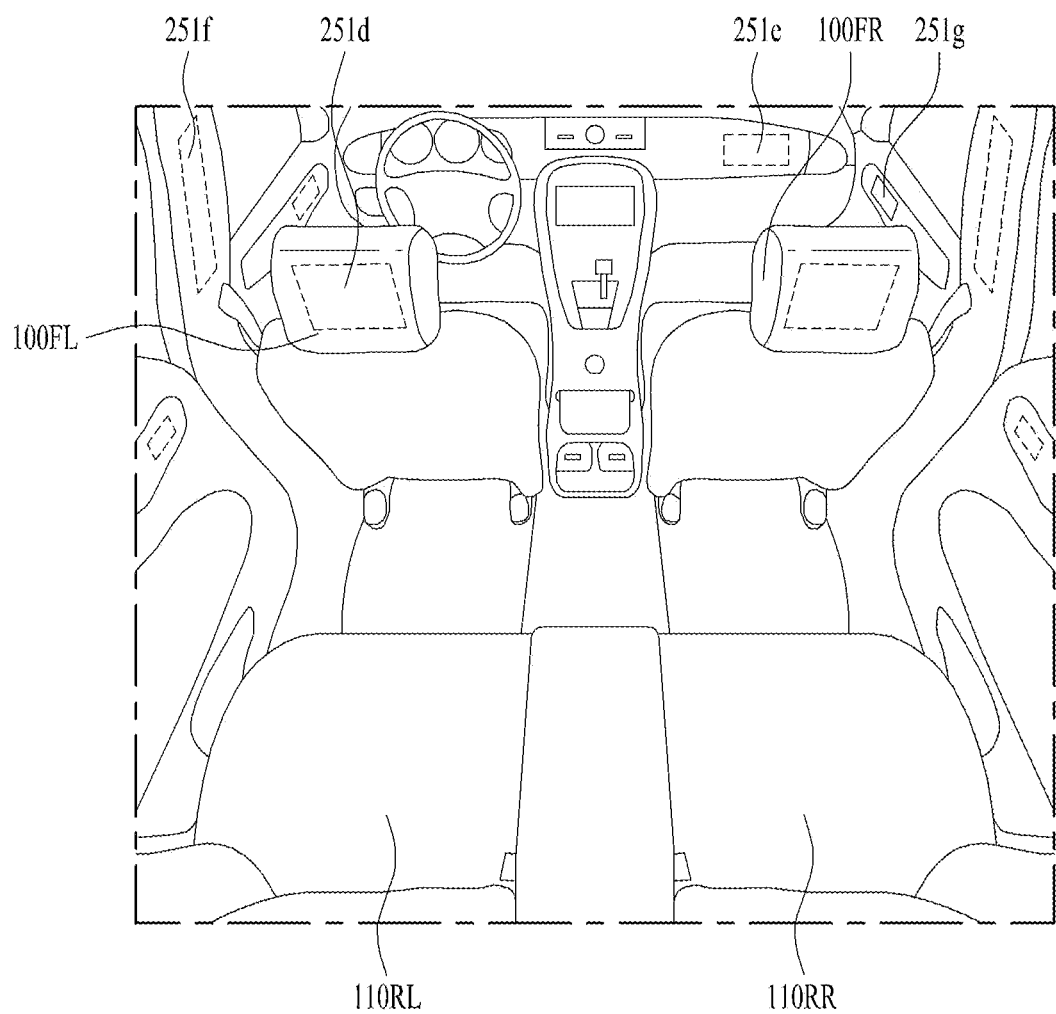

FIG. 3 and FIG. 4 are diagrams illustrating the interior of a vehicle according to an aspect of the present disclosure.

Figure 5:
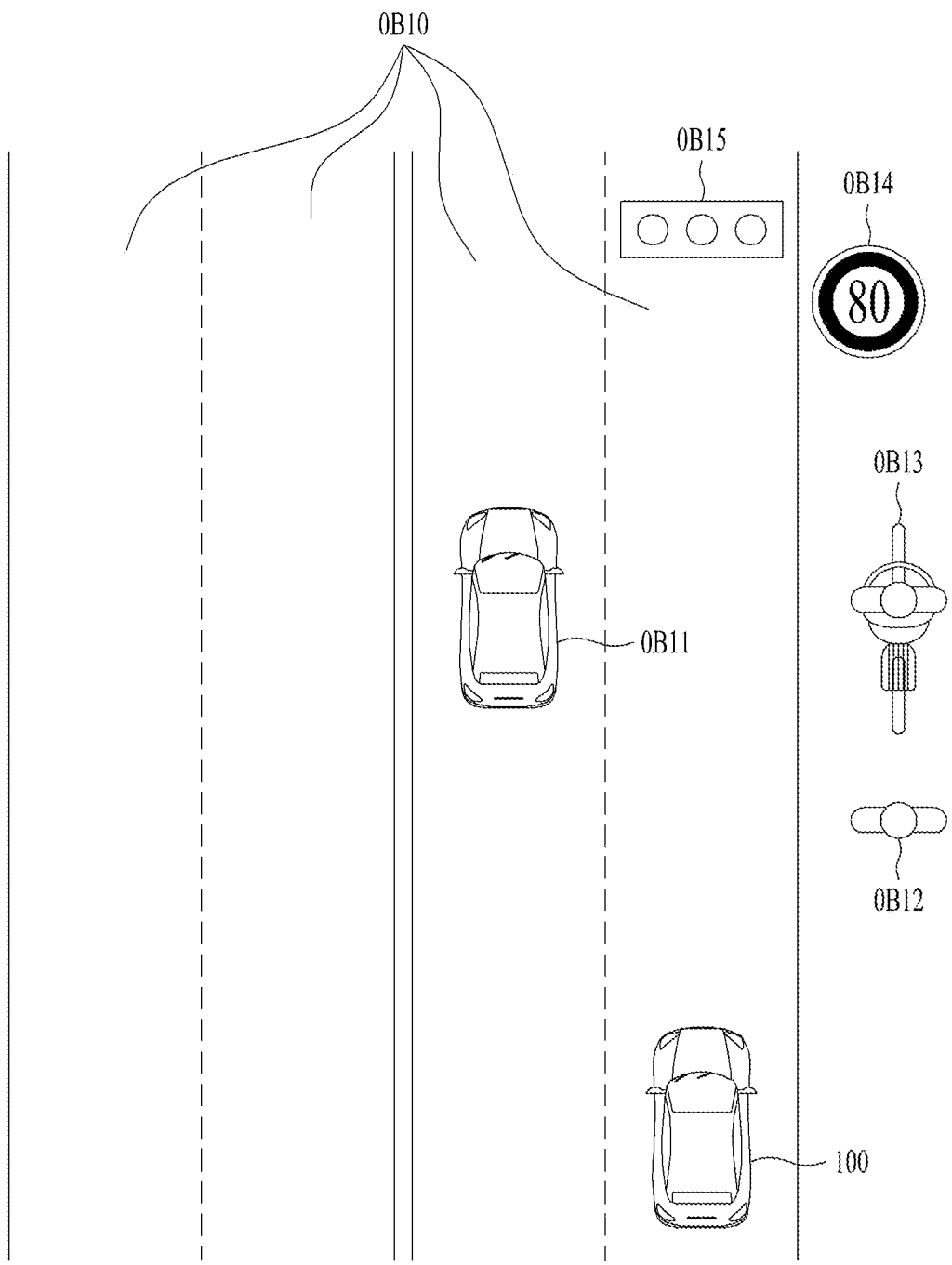
FIG. 5 and FIG. 6 are diagrams referred to for describing an object according to an aspect of the present disclosure.
Figure 6:
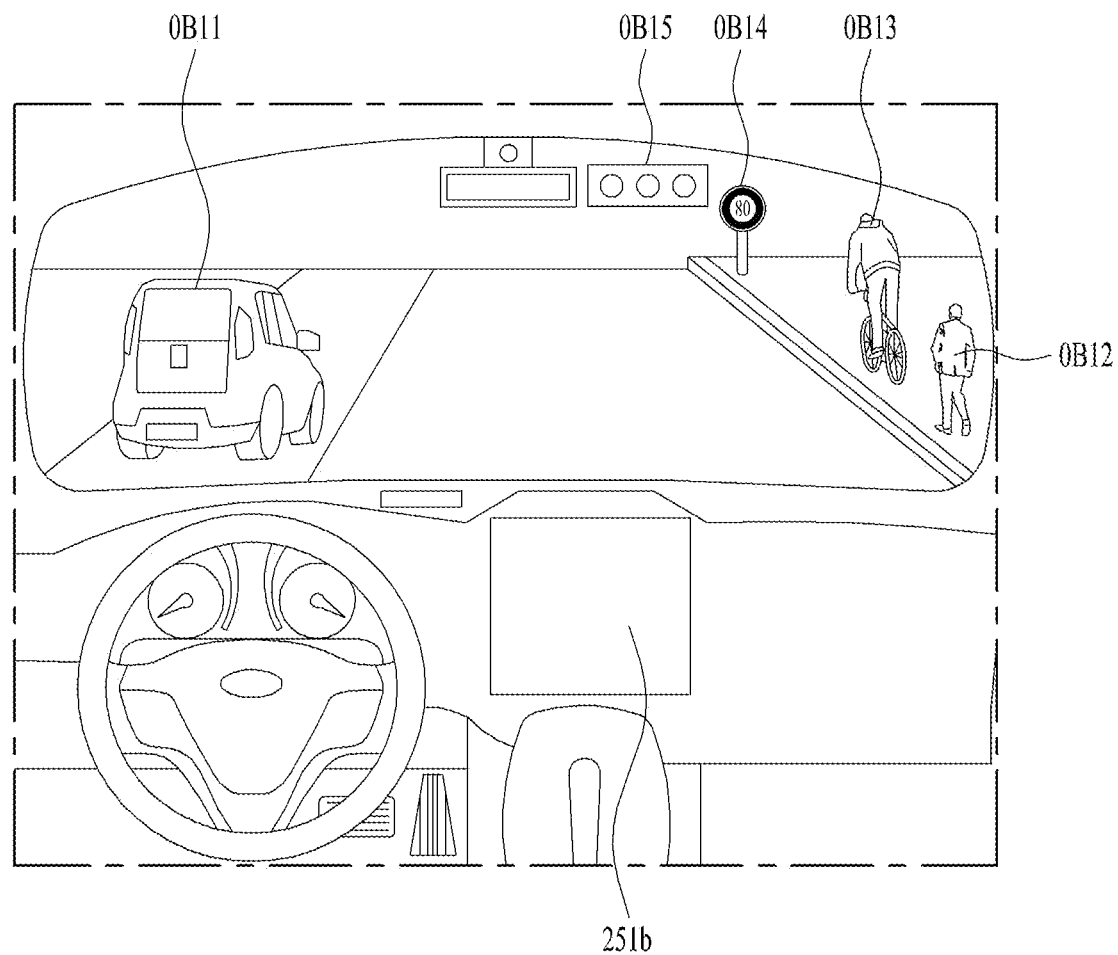

FIG. 5 and FIG. 6 are diagrams referred to for describing an object according to an aspect of the present disclosure.

Figure 7:
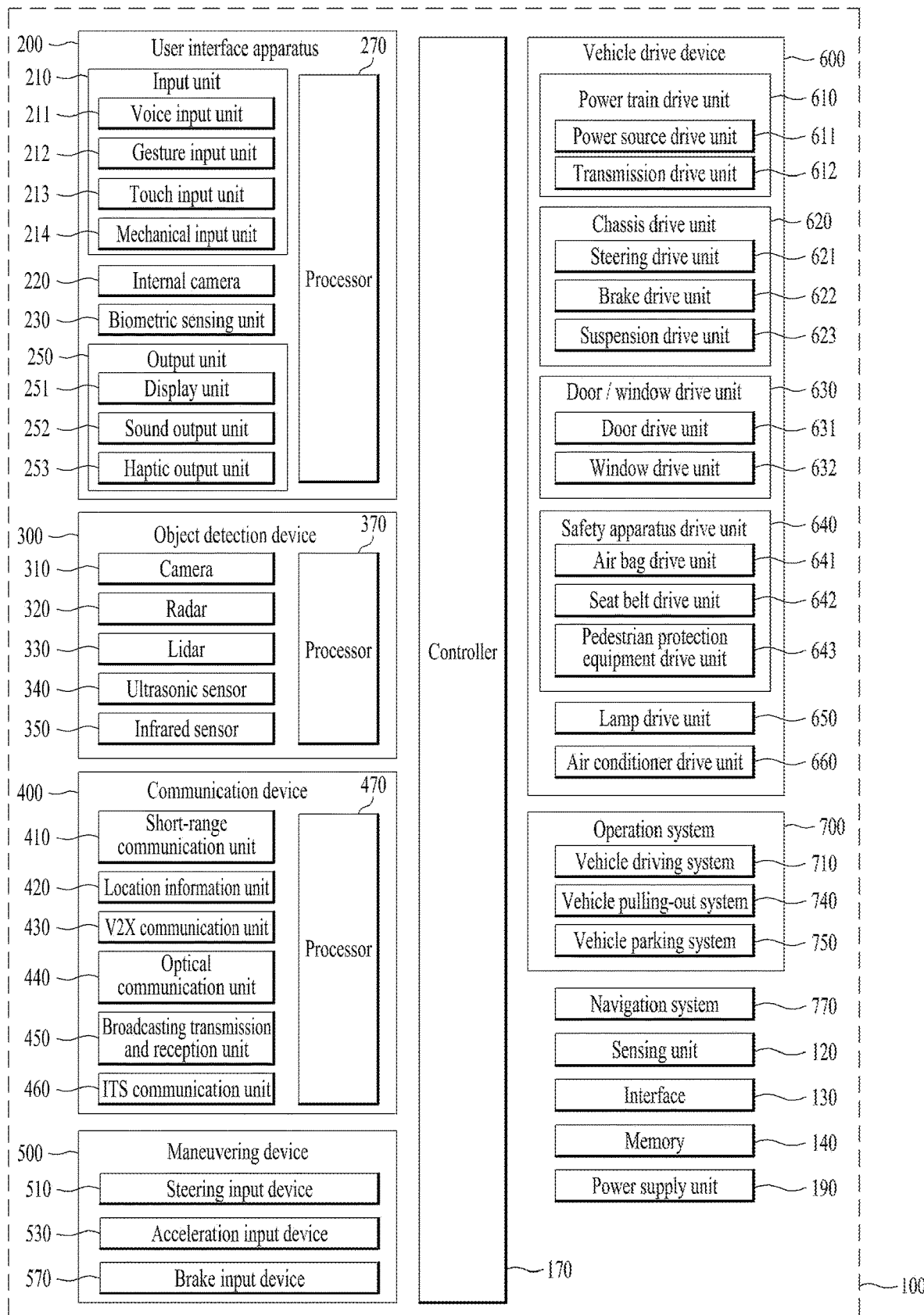
FIG. 7 is a block diagram referred to for describing a vehicle according to an aspect of the present disclosure.

FIG. 7 is a block diagram referred to for describing a vehicle according to an aspect of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may be switched to an autonomous mode or a manual mode in response to a user input. For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information. The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300. In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Moreover, the sensing unit 120, the interface unit 130, the memory 140, the power supply unit 190, the user interface device 200, the object detection device 300, the communication device 400, the maneuvering device 500, the vehicle drive device 600, the operation system 700 and the navigation system 770 may have individual processors or be integrated into the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors. The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window. The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100. Meanwhile, the user interface device 200 may be referred to as a display device for vehicle. The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope. The structure may be a body located around the road in the state of being fixed onto the ground. For example, the structure may include a streetlight, a roadside tree, a building, a traffic light, and a bridge. The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device 300 may be separated from or integrated with the sensing unit 120, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100. The object detection device 300 may operate under control of the controller 170.

The communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an Audio Video Navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. Meanwhile, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. Meanwhile, in a case where an engine is the power source, the transmission drive unit 612 may adjust a gear-engaged state to the drive position D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. Meanwhile, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component. Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400. In some embodiments, the navigation system 770 may be classified as an element of the user interface device 200.

Figure 8:
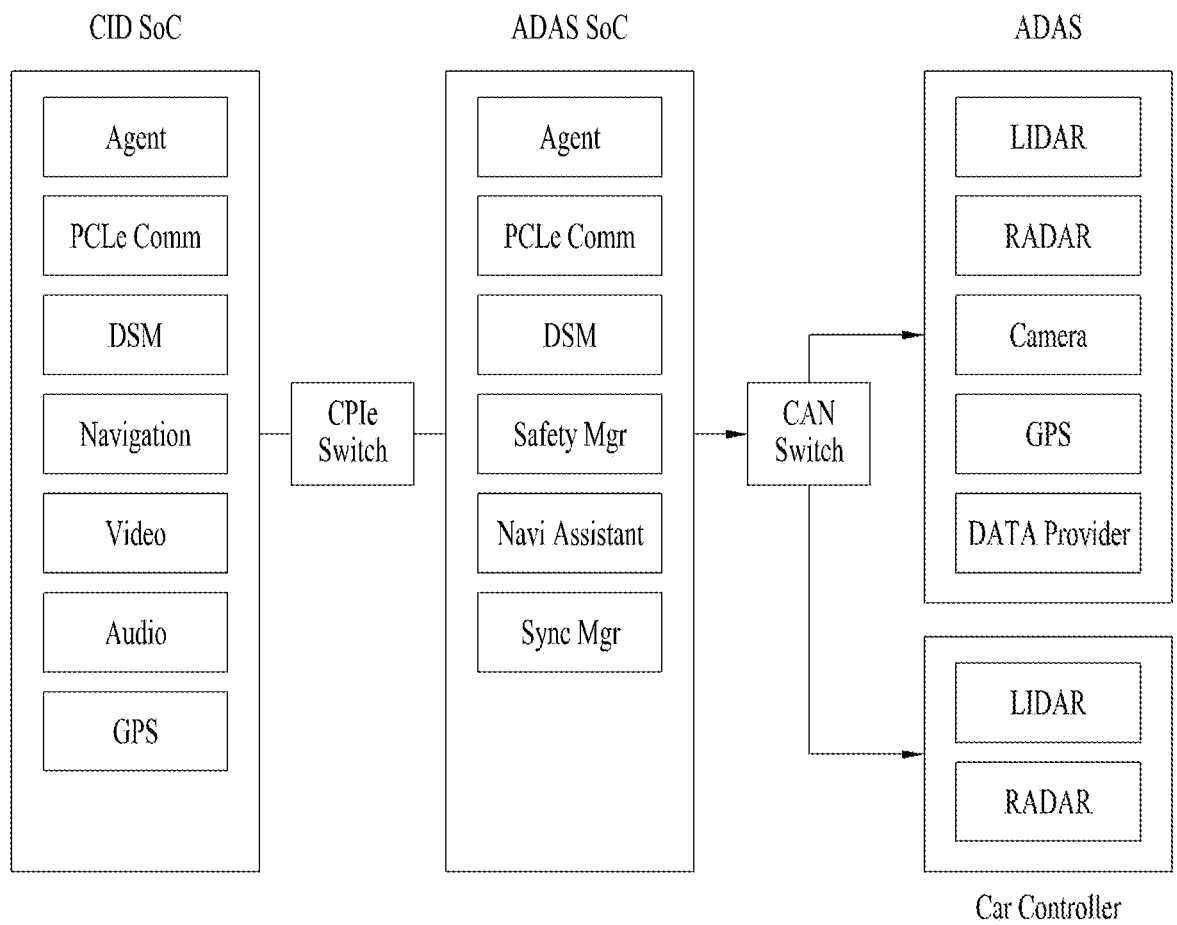
FIG. 8 is a block diagram illustrating the software configuration of a multi-system-on-chip (multi-SoC)-based car controller (MSCC) system according to an aspect of the present disclosure.

Multi-System-On-Chip (Multi-SoC) Car Controller (MSCC) System_Software Configuration FIG. 8 is a block diagram illustrating the software configuration of an MSCC system according to an aspect of the present disclosure. The MSCC system may operate based on peripheral component interconnect express (PCIe).

Specifically, a central information display (CID) SoC may include an agent, a PCIe communicator, a data sharing manager (DSM), a navigator, a video/audio device, and a global positioning system (GPS) device. An advanced driver assistant system (ADAS) SoC may include an agent, a PCIe communicator, a DSM, a safety manager, a navigation assistant, and a synchronization manager. An ADAS may include a light detection and ranging (lidar), a radio detection and ranging (radar), a camera, a GPS device, and a data provider. A car controller may include a controller area network (CAN) manager and an electronic control unit (ECU). Some components may be omitted in or added to the components of the CID SoC, the ADAS SoC, the ADAS, and the car controller.

Because a large amount of data are transmitted and received between the CID SoC and the ADAS SoC, the CID SoC and the ADAS SoC are connected to each other via a PCIe interconnection. General commands are transmitted and received between the ADAS SoC and the ADAS and between the ADAS SoC and the car controller. Therefore, the ADAS SoC is connected to the ADAS and the car controller via CAN buses.

Multi-SoC-based Car Controller System_Hardware Configuration

Figure 9:
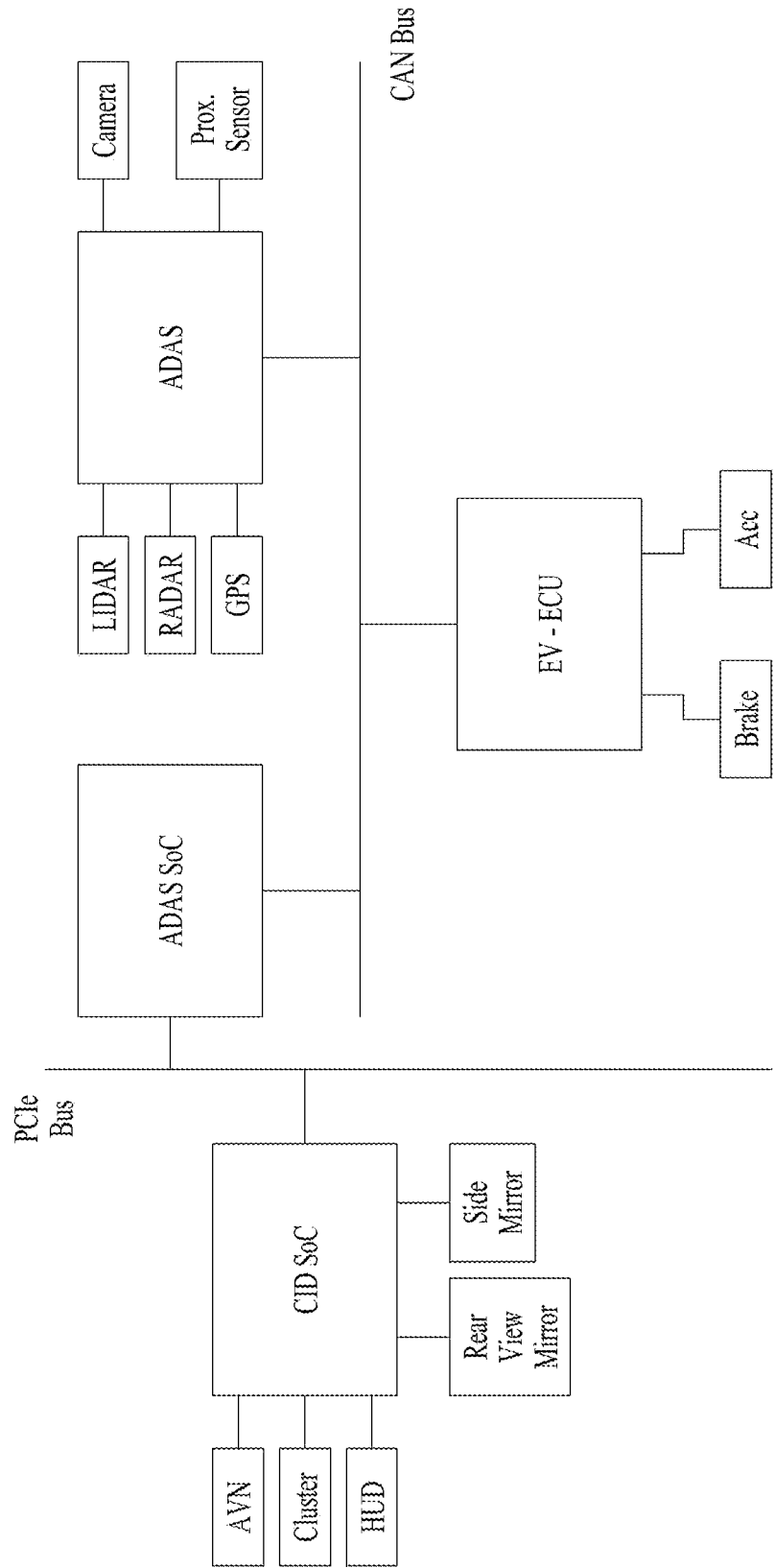
FIGS. 9 and 10 are block diagrams illustrating the hardware configuration of an MSCC system according to an aspect of the present disclosure.
Figure 10:
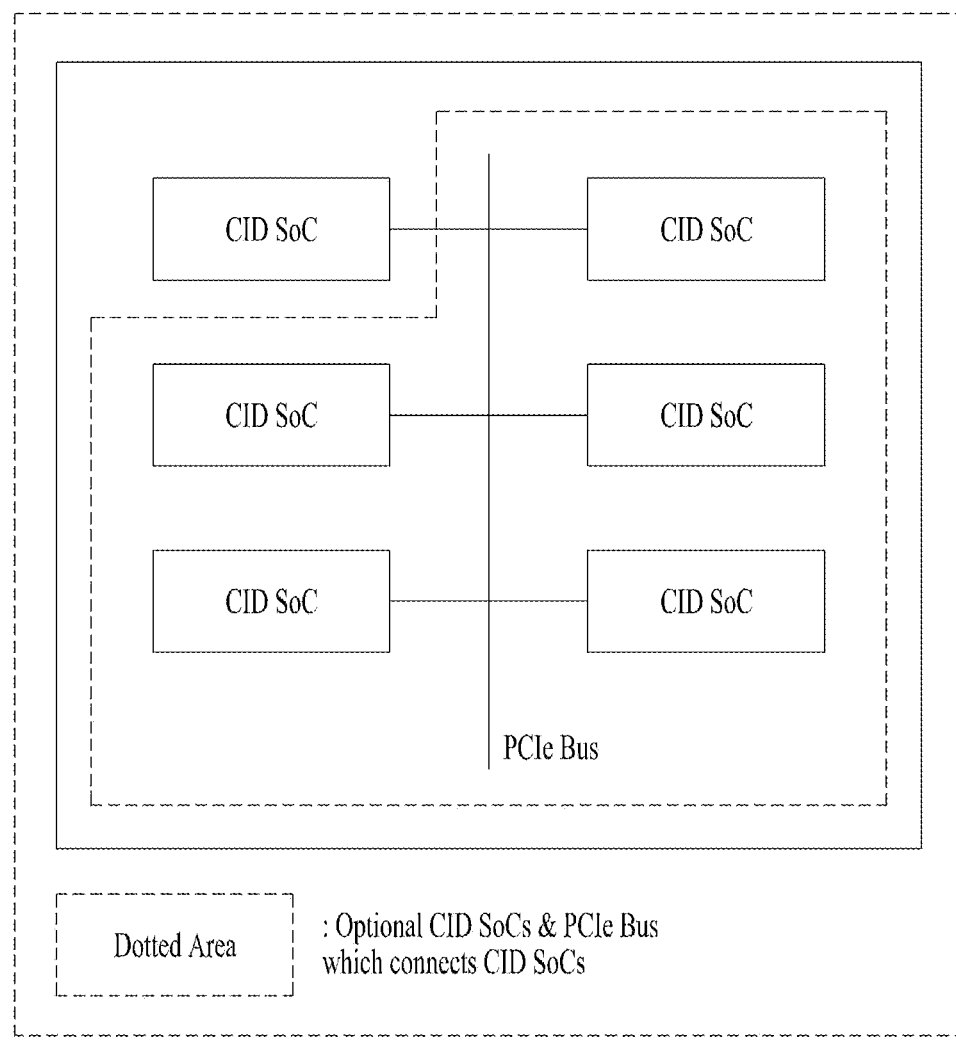

FIGS. 9 and 10 are diagrams illustrating the hardware configuration of an MSCC system according to an aspect of the present disclosure. Referring to FIG. 9, SoCs are interconnected via a PCIe bus, and the other components are interconnected via CAN buses, as described with reference to FIG. 8. The sub-components (an audio video navigation (AVN), a cluster, a head up display (UD), a rear view mirror, and a side mirror) may be designed as independent SoCs depending on an actual system configuration. Referring to FIG. 10, the MSCC system according to an aspect of the present disclosure may include one or more SoCs. Added SoCs may be interconnected via a PCIe bus, as described before.

The components of the MSCC system illustrated in FIGS. 8, 9 and 10 will be described in detail. The MSCC system may include a CID SoC, an ADAS SoC, and ADAS, and a car controller. Each component may include one or more sub-components. Sub-components common to these four components will first be described below.

An agent is responsible for communication between SoCs. That is, upon receipt of a specific request, the agent may packetize data and transmit a packet to the other SoC over PCIe. Specifically, i) an agent resides in each of the infotainment SoC and the ADAS SoC to transmit necessary information to the other SoC, and ii) the agent transmits necessary information to the infotainment SoC or the CAN manager based on information provided to the safety manager of the ADAS SoC.

i) A DSM enables connection between applications of different nodes by a PCIe interconnection supporting Socket/SISCI, and ii) the DSM executes a data sharing function. The DSM is characterized in that even without knowledge of the position of a specific node accessible to a client side, the DSM may generate and manage information such as an IP and a port in the case of Socket and information such as an adaptor number, a node identifier (ID), and a segment ID in the case of SISCI by separating client and server functions and thus enable interconnection only by a unique key, for data sharing.

PCIe communication software (SW) conducts PCIe Socket/SISCI communication by NT/DMA transfer control of a PCIe switch. A CAN controls data transmission between the ECUs of a vehicle safety system and a convenience system, and controls an information communication system and an entertainment system.

The CID SoC may further include an audio device that controls the audio output of a CID, a video device that controls the video output of the CID, and a navigator that provides map information and detects or guides a route.

The ADAS SoC may i) combine information generated from the ADAS and the CID, ii) detect and predict risk factors, iii) generate a vehicle control signal and transmit the vehicle control signal to the car controller, and iv) generate a CID control signal and transmit the CID control signal to the agent of the CID SoC. Further, the ADAS SoC may include a synchronization manager that provides a means for synchronizing the system clock signals (e.g., time clock synchronization) of the CID SoC, the ADAS SoC, and the ADAS.

The ADAS may include a lidar that detects the distance to an object and various physical properties of the object by projecting laser light to the target object, a radar that detects a remote target such as a ship, an aircraft, or rain cloud based on straightness and reflectivity of pulsed waves and provides information about the distance and direction of the target, a GPS device that calculates the current position of a user by receiving signals from GPS satellites, and a data provider that transmits ADAS information to the ADAS SoC.

The car controller may include a CAN manager that controls the vehicle in response to a command received from the ADAS agent.

Figure 11:
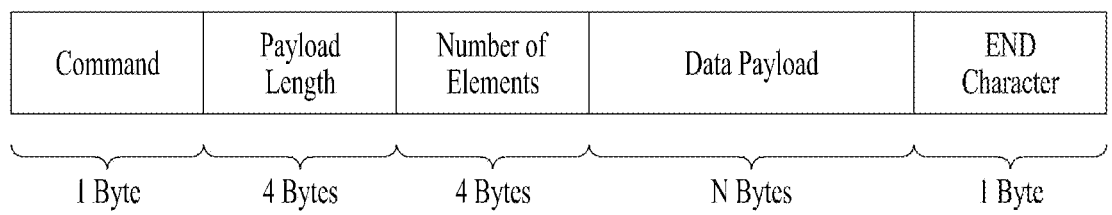
FIGS. 11 and 12 are diagrams illustrating a communication structure between components in an MSCC system according to an aspect of the present disclosure.
Figure 12:
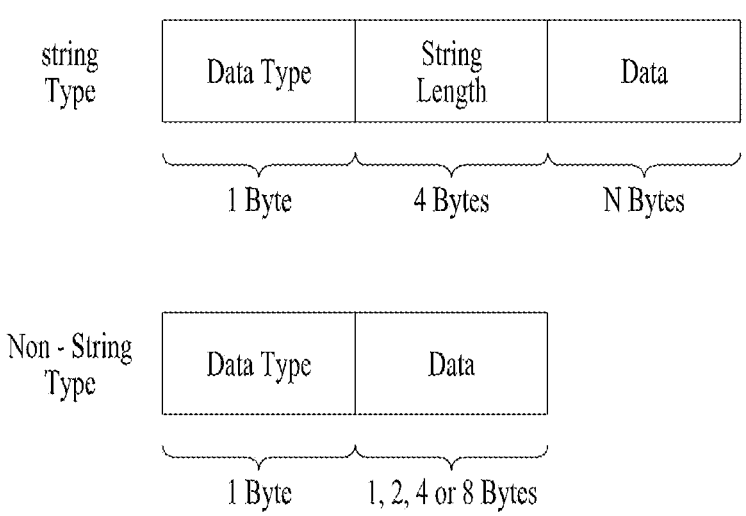

Multi-SoC-based Car Controller System_Communication Structure between Components FIGS. 11 and 12 are diagrams illustrating a communication structure between components in an MSCC system according to an aspect of the present disclosure.

The afore-described four components, that is, the CID SoC, the ADAS SoC, the ADAS, and the car controller may communicate by using a packet structure illustrated in FIG. 11. In the packet structure illustrated in FIG. 11, a header includes Command, Payload Length, Number of Elements and END Character, and Data Payload carries actual data.

The session description protocol (SDP) used for a mirrorlink is known as a protocol having a transmission structure similar to the packet transmission structure illustrated in FIG. 11. Compared to the SDP, the packet transmission structure of the MSCC system proposed in the present disclosure is characterized by i) deletion of an unnecessary field and ii) a more simplified command structure.

Data Payload includes as many Data fields as the value of Number of Elements. The type of each Data field may be String(N Byte) or Non-String(Bool(1 Byte), Integer(4 Byte), Long(8 Byte), Float(4 Byte), and Double(8 Byte)). For these types, the packet structures of Data Payload are illustrated in FIG. 12. The packet blocks illustrated in FIGS. 11 and 12 may be summarized in Table 1 below.

TABLE 1

| Command | | Command to be transmitted. Defined by enum. |
|---|---|---|
| Payload Length | | Total packet length |
| Number of Elements | | Number of Data in Data Payload |
| Data Payload (Parameter) | Data Type | Data type. Boolen, Int., Long, Float, Double, and String. |
| | String Length | The length of a string into which data is converted. |
| | String | Data converted into string |
| END Character | | Character indicating end of packet |

Multi-SoC-Based Car Controller System_Vehicle Control Sequence

Figure 13:
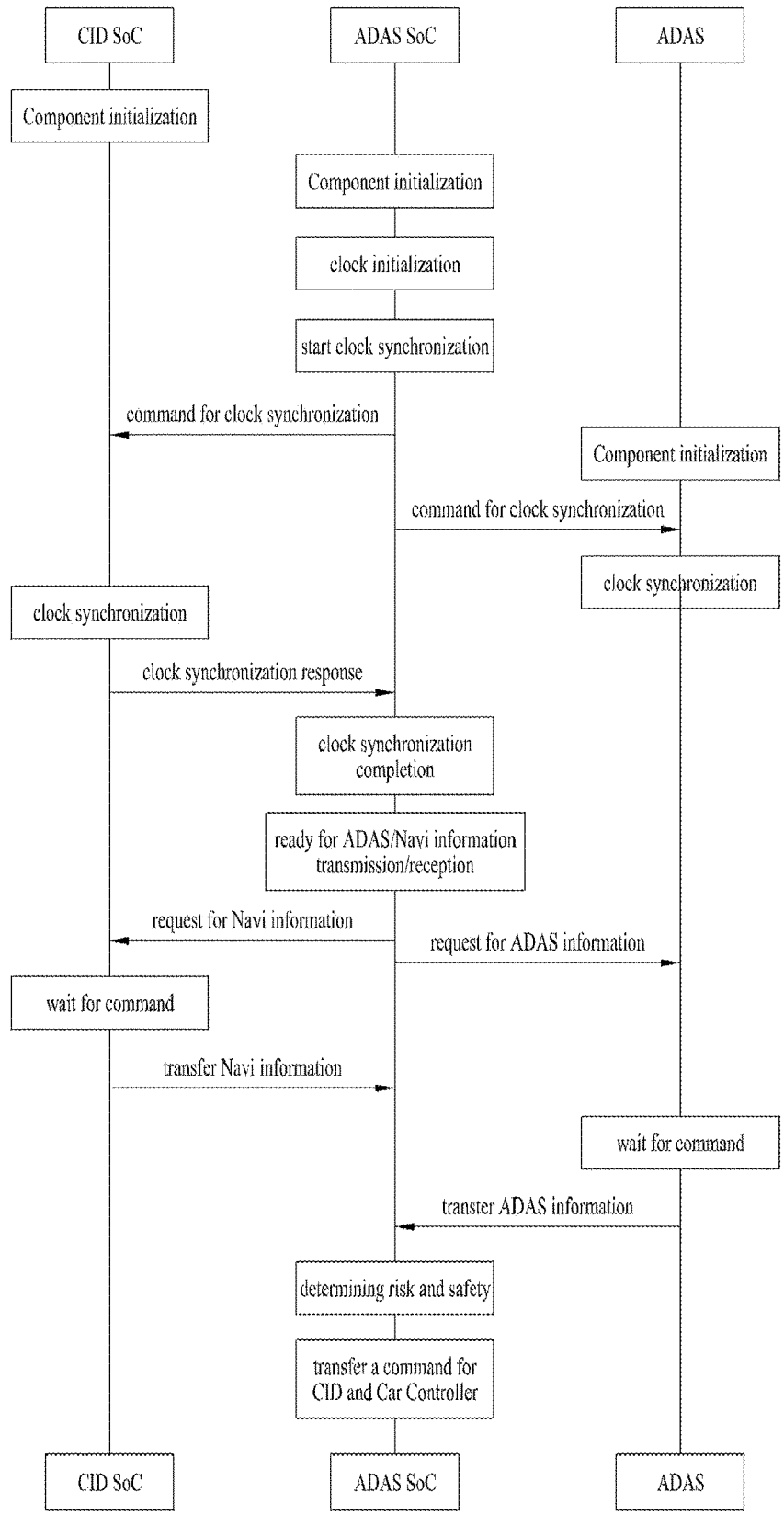
FIG. 13 is a diagram illustrating a vehicle control sequence or scenario through a central information display (CID) SoC, an advanced driver assistant system (ADAS) SoC, and an ADAS in an MSCC system according to an aspect of the present disclosure.

FIG. 13 is a diagram illustrating a vehicle control sequence or scenario involving a CID SoC, an ADAS SoC, and an ADAS in an MSCC system according to an aspect of the present disclosure. Referring to FIG. 13, the vehicle control sequence or scenario may basically include i) component initialization, ii) information transmission and reception (e.g., information request and information transfer), iii) safety determination by a safety manager, and iv) control command transmission.

As a synchronization exception handling scenario of the ADAS SoC, case 1) when the difference between the timestamp of information received from the CID SoC and the timestamp of information received from the ADAS increases gradually (e.g., more than several msec), buffer initialization and/or transmission interval adjustment may be performed according to a flush command, and case 2) when no response or no information is not received for a certain period of time, a Request Alive command is transmitted in software, or when there is no response in spite of the transmission of the Request Alive command, chip reset may be performed using a hardware reset pin. Step i) to step iv) described above will be described with reference to FIGS. 14 to 16.

Figure 14:
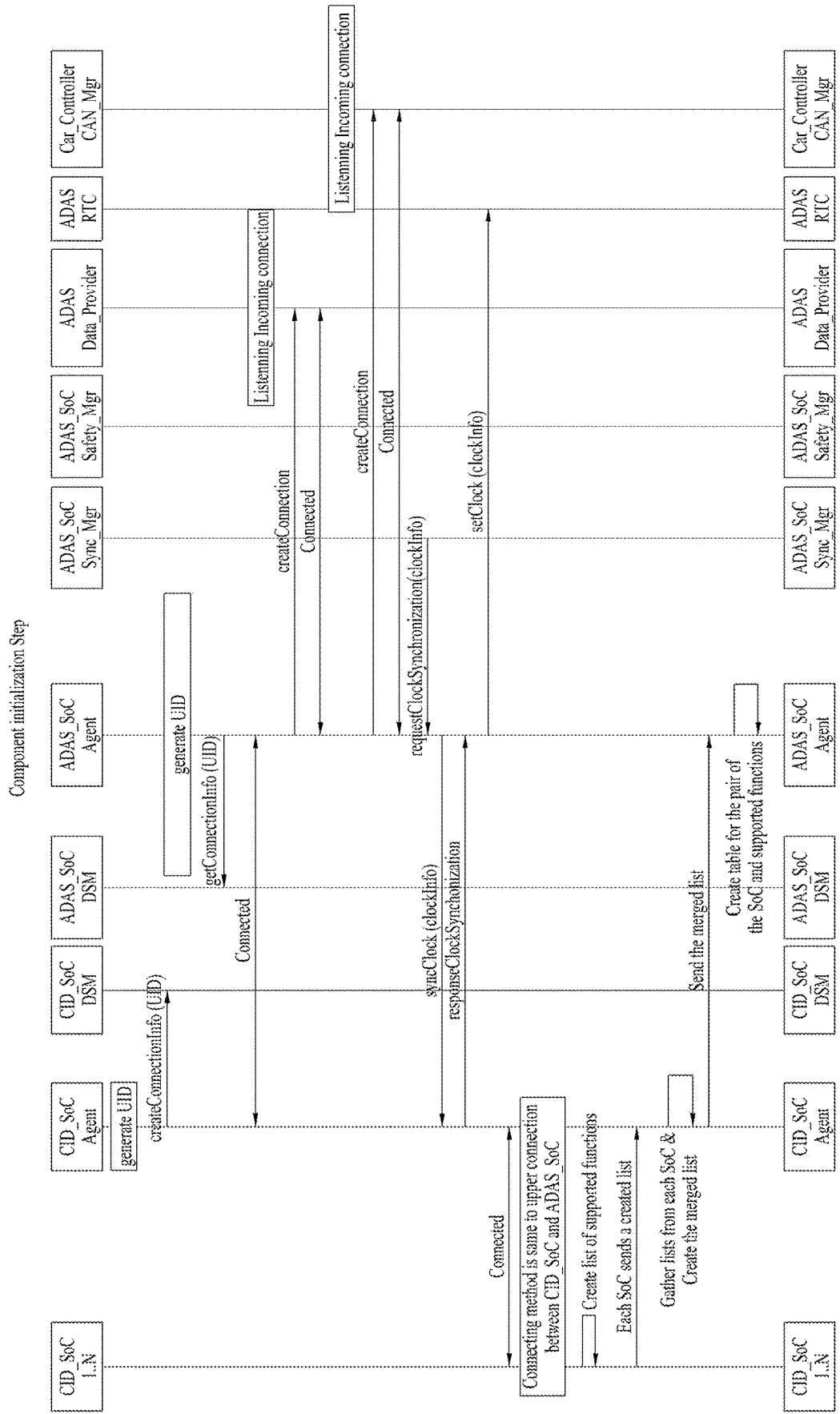
FIG. 14 is a diagram illustrating component initialization in an MSCC system according to an aspect of the present disclosure.

FIG. 14 is a diagram illustrating component initialization in an MSCC system according to an aspect of the present disclosure. Specifically, each of the CID SoC, the ADAS SoC, and the ADAS may first perform component initialization. Referring to FIG. 14, the component initialization may be performed in the following order.

i) The agent of the CID SoC and the agent of the ADAS SoC are connected to each other; ii) PCIe SW is initialized for PCIe connection between the SoCs, and data sharing is enabled; iii) the ADAS SoC and the ADAS are connected; iv) the ADAS SoC and the car controller are connected; and v) clock signals are synchronized; vi) the CID SoC and sub-SoCs (e.g., CID_SoC 1 to CID_SoC N) are connected, and supported functions (e.g., navigation, audio, and video) for each SoC are listed in a table.

Figure 15:
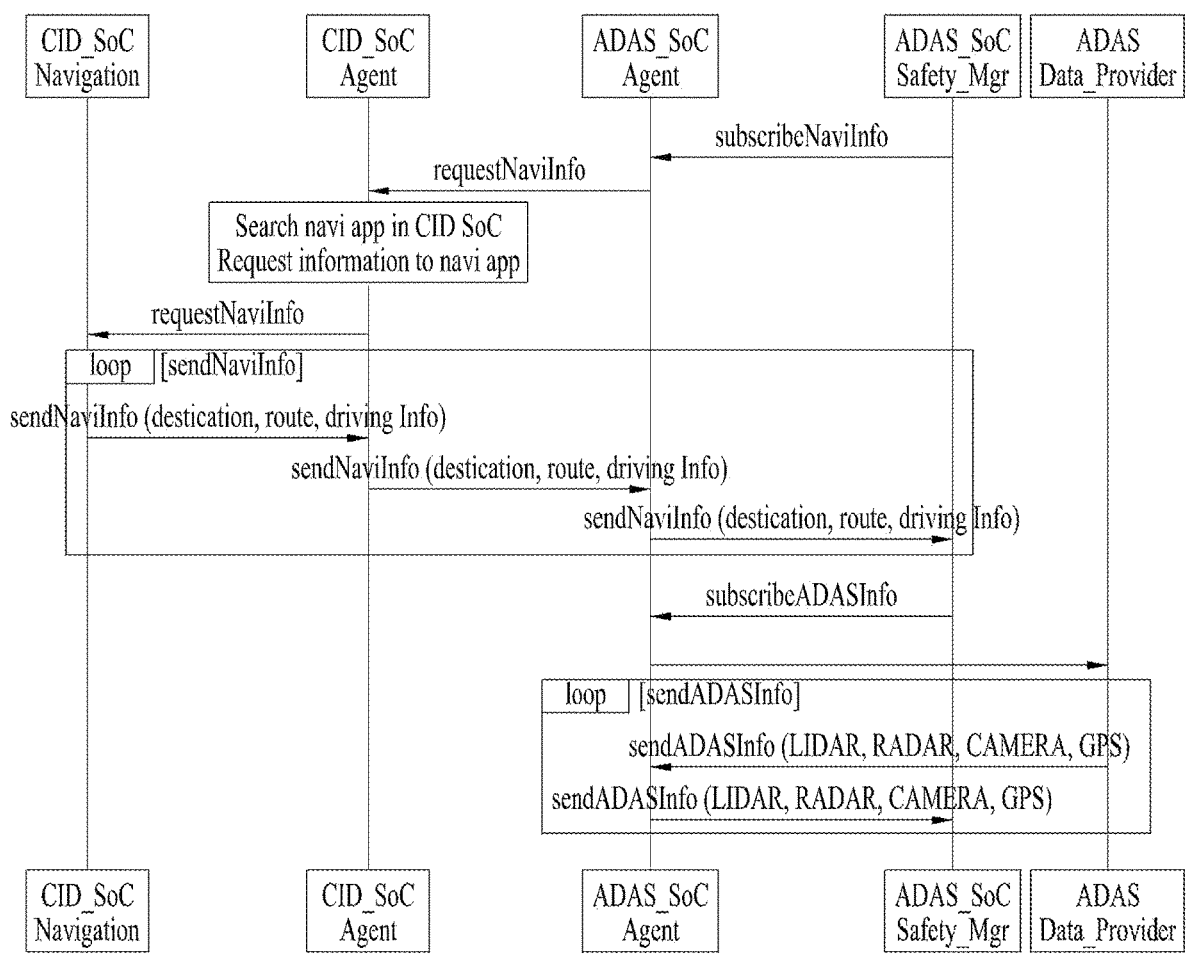
FIG. 15 is a diagram illustrating information transmission and reception in an MSCC system according to an aspect of the present disclosure.

FIG. 15 is a diagram illustrating information transmission and reception in an MSCC system according to an aspect of the present disclosure. Upon completion of the component initialization described with reference to FIG. 14, the MSCC system may perform information transmission and reception. A specific process of transmitting and receiving information may be performed as follows.

i) The agent of the ADAS SoC requests navigation information of the CID SoC; ii) the navigation device of the CID SoC transmits information such as a destination, a driving route, and a speed to the ADAS agent; iii) the agent of the ADAS SoC requests information such as information of the lidar, the radar, the camera, and the GPS device; and iv) the data provider of the ADAS transmits the information of the lidar, the radar, the camera, and the GPS device to the ADAS SoC. Steps i) and ii) and steps iii) and iv) described above may be performed simultaneously or sequentially.

Figure 16:
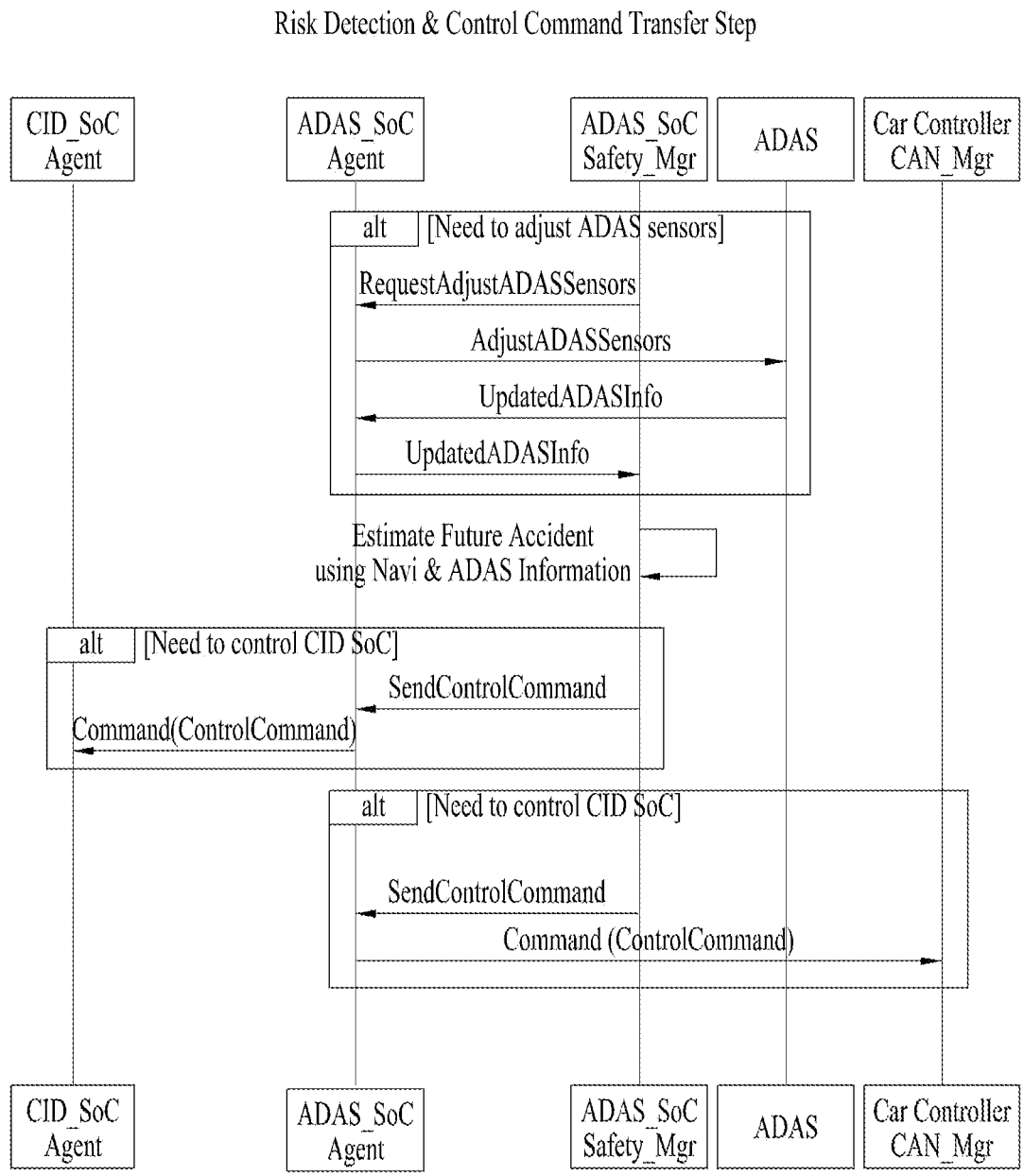
FIG. 16 is a diagram illustrating an operation of evaluating safety and transmitting a control command by a safety manager in an MSCC system according to an aspect of the present disclosure.

FIG. 16 is a diagram illustrating an operation of evaluating safety and transmitting a control command transmission by a safety manager in an MSCC system according to an aspect of the present invention. The safety evaluation may include i) transmission of navigation information and ADAS information to the safety manager by the agent of the ADAS SoC and ii) combining of the received information and risk prediction by the safety manager. The control command transmission may include i) transmission of a control command to the CID SoC through the agent of the ADAS by the safety manager (warning) and ii) transmission of the control command to the car controller through the agent of the ADAS by the safety manager (vehicle control).

With reference to FIGS. 13 to 16, a basic operation of the MSCC system has been described above. Now, a description will be given of a specific implementation example with reference to FIGS. 17 to 21.

Multi-SoC-Based Car Controller System_Implementation 1

Figure 17:
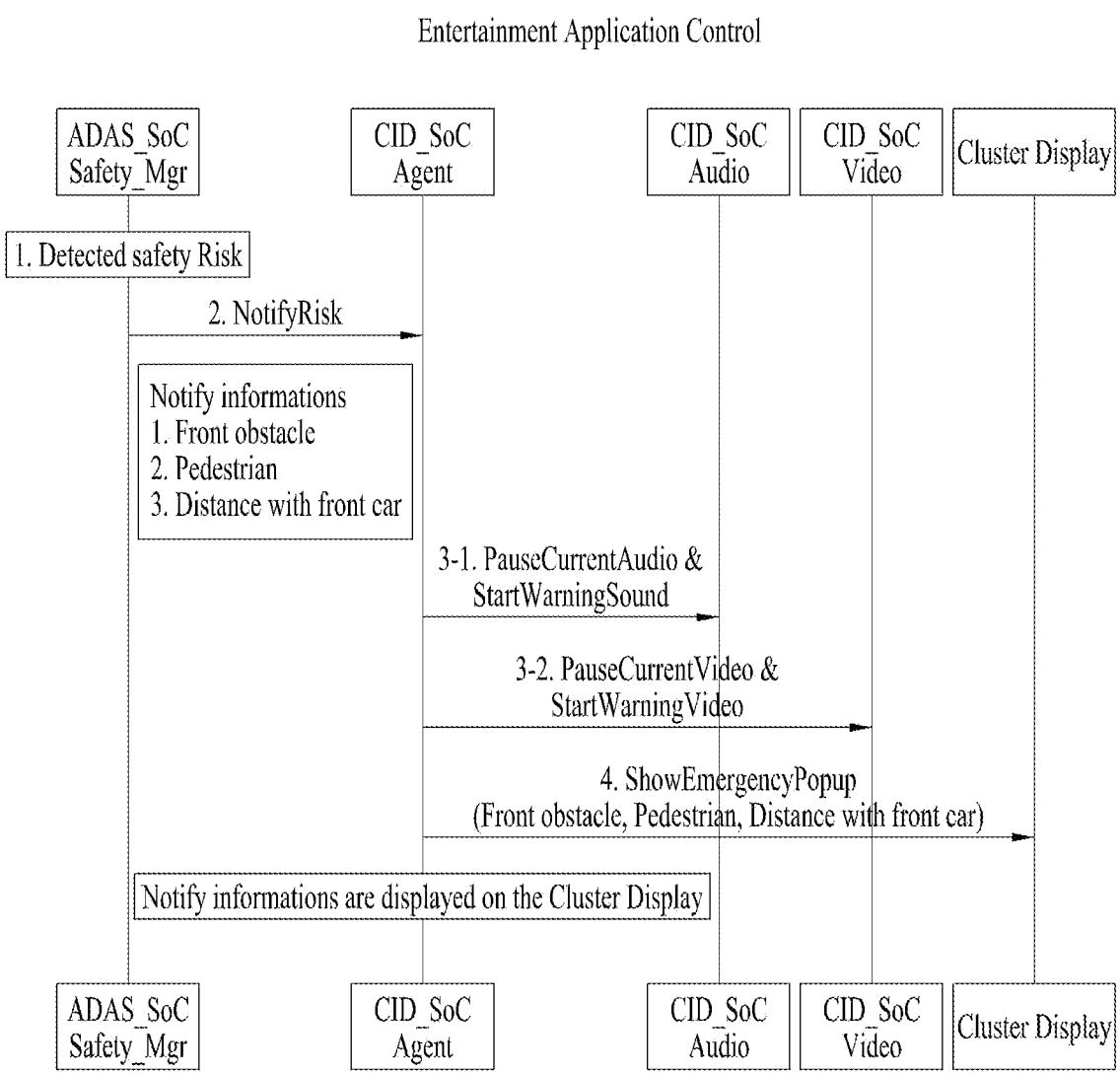
FIG. 17 is a diagram illustrating a method of controlling a CID SoC by an ADAS SoC according to a first implementation.

FIG. 17 is a diagram illustrating a method of controlling a CID SoC by an ADAS SoC according to a first implementation. Specifically, the first implementation may be applied when an entertainment application is controlled, upon occurrence of a risk to a vehicle in an autonomous driving mode. Referring to FIG. 17, the method of controlling the CID SoC by the ADAS SoC may be performed in the following order of i) to iv).

i) During autonomous driving, the driver is concentrating on an entertainment application (e.g., a video, a game, or the like) of the CID, and the ADAS SoC is monitoring the risk of accidents in real time through the safety manager. ii) When the safety manager of ADAS SoC detects an accident risk, the safety manager notifies the agent of the CID SoC of an event of the occurrence of the accident risk through the agent of the ADAS SoC. iii) The agent of the CID SoC discontinues the use of the entertainment application in the CID, displays a warning pop-up, and emits a warning sound. iv) When the accident risk disappears, the safety manager of the ADAS SoC transmits an event termination pop-up to the agent of the CID SoC to resume the use of the entertainment application.

Each of the above-described steps may be described as follows in terms of a function call and a command flow: i) the Safety Mgr of the ADAS_SoC monitors whether there is an accident risk; ii) the Safety Mgr of the ADAS_SoC delivers accident risk information (e.g., the presence/absence of an obstacle ahead, the distance to a pedestrian, the distance to a vehicle in front, and so on) to the Agent of the CID SoC; iii) the Agent of the CID_SoC transmits a pause command to the audio and video devices of the CID_SoC; and iv) the Agent of the CID_SoC shows an emergency pop-up on a cluster display and displays the accident risk information (e.g., the presence/absence of an obstacle ahead, the distance to a pedestrian, the distance to a vehicle in front, and so on).

Multi-SoC-Based Car Controller System_Implementation 2

Figure 18:
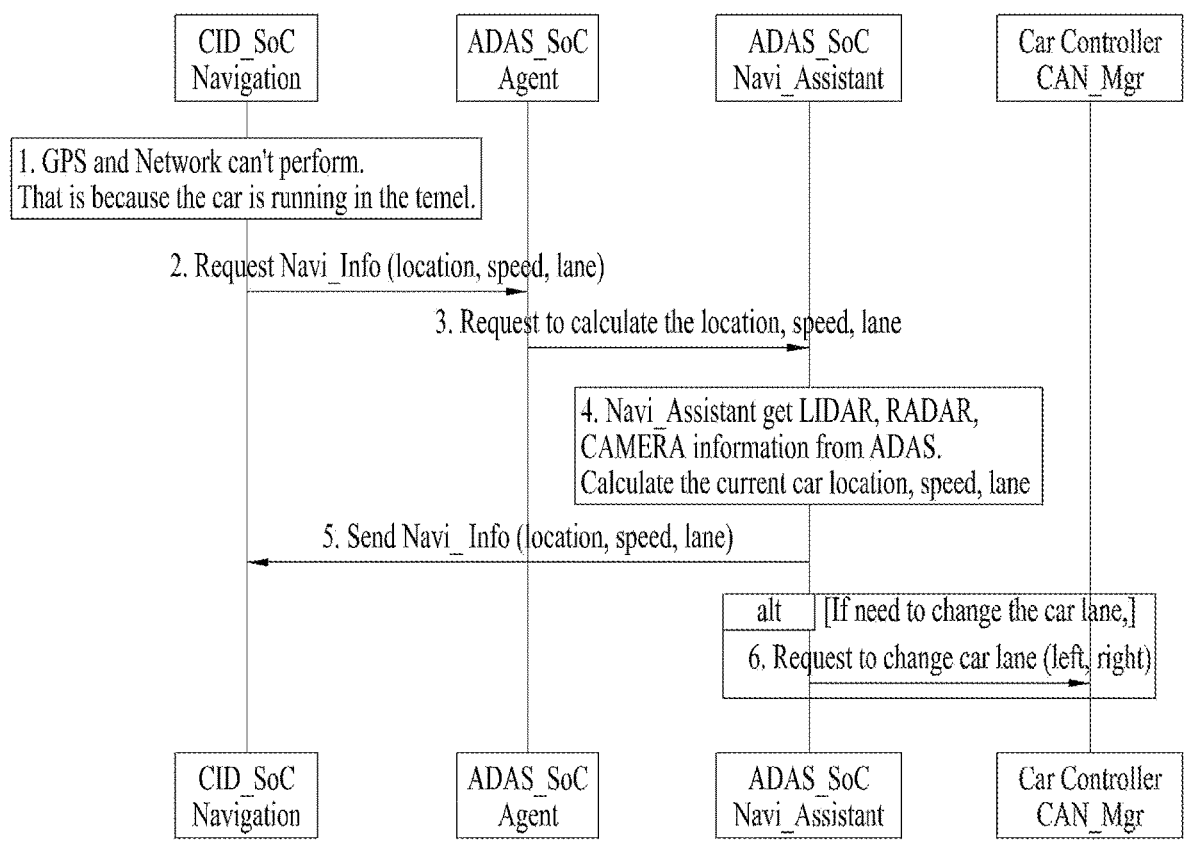
FIG. 18 is a diagram illustrating a method of controlling a CID SoC by an ADAS SoC according to a second implementation.

FIG. 18 is a diagram illustrating a method of controlling a CID SoC by an ADAS SoC according to a second implementation. Specifically, the second implementation relates to a method of controlling the CID SoC by the ADAS SoC, when the vehicle is disconnected from both of network and GPS connections. For example, when GPS and location information is lost due to an underground tunnel or network loss, the CID SoC may indicate the loss of the GPS and location information to the ADAS SoC. The ADAS SoC may calculate a speed and a position using ADAS information and update the current position and speed of the vehicle for the CID SoC. Further, in the case of autonomous driving, the ADAS SoC may determine whether it is necessary to change a lane and indicate the determination to the car controller, for lane change.

Referring to FIG. 18, the method of controlling the CID SoC by the ADAS SoC may be performed in the following order of i) to iii).

i) When network and GPS connections are disconnected due to travel through a tunnel during driving on a navigation route, a navigation app requests corrected navigation information to the navigation assistant of the ADAS SoC through the agent in order to continuously update the route. ii) Upon receipt of an information update request from the CID navigator, the navigation assistant of the ADAS SoC receives ADAS information (e.g., information of the radar, the lidar, and the camera) from the ADAS provider, calculates a current speed and position, and transmits information about the current sped and position to the navigation app of the CID SoC through the agent. In the case of autonomous driving, the navigation assistant also calculates whether lane change is necessary and, when the lane change is necessary, transmits a lane change command to the CAN manager of the car controller through the agent. iii) The navigation app of the CID SoC updates a screen based on the information received from the navigation assistant of the ADAS SoC. When the network and GPS connections are disconnected, the navigation app of the CID SOC continuously requests information to the ADAS SoC to update the screen. When the network and GPS connections are reconnected after the vehicle exits the tunnel, the navigation app of the CID SOC discontinues requesting information to the ADAS SoC.

Each of the above-described steps may be performed as follows in terms of a function call and a command flow.

i) The CID_SoC Navigation loses GPS and/or location information due to an underground tunnel and/or network loss; ii) the CID_SoC Navigation requests accurate Navigation Info (e.g., current location, speed, lane information) to the ADAS_SoC; iii) the ADAS_SoC Agent requests the ADAS_SoC Navigation Assistant to calculate the current location, speed, and lane information; iv) the ADAS_SoC Navigation Assistant receives Camera, RADAR, LIDAR, and GPS from the ADAS and calculates the current location, speed, and lane information; v) the ADAS_SoC Navigation Assistant transmits the calculated current position, speed, and lane information to the CID_SoC; vi) the CID_SoC Navigation updates current navigation information based on the received current position, speed, and lane information; and vii) when a lane change is necessary, the ADAS_SoC Navigation Assistant requests the Car_Controller Can_Mgr to change a lane.

Multi-SoC-Based Car Controller System_Implementation 3

Figure 19:
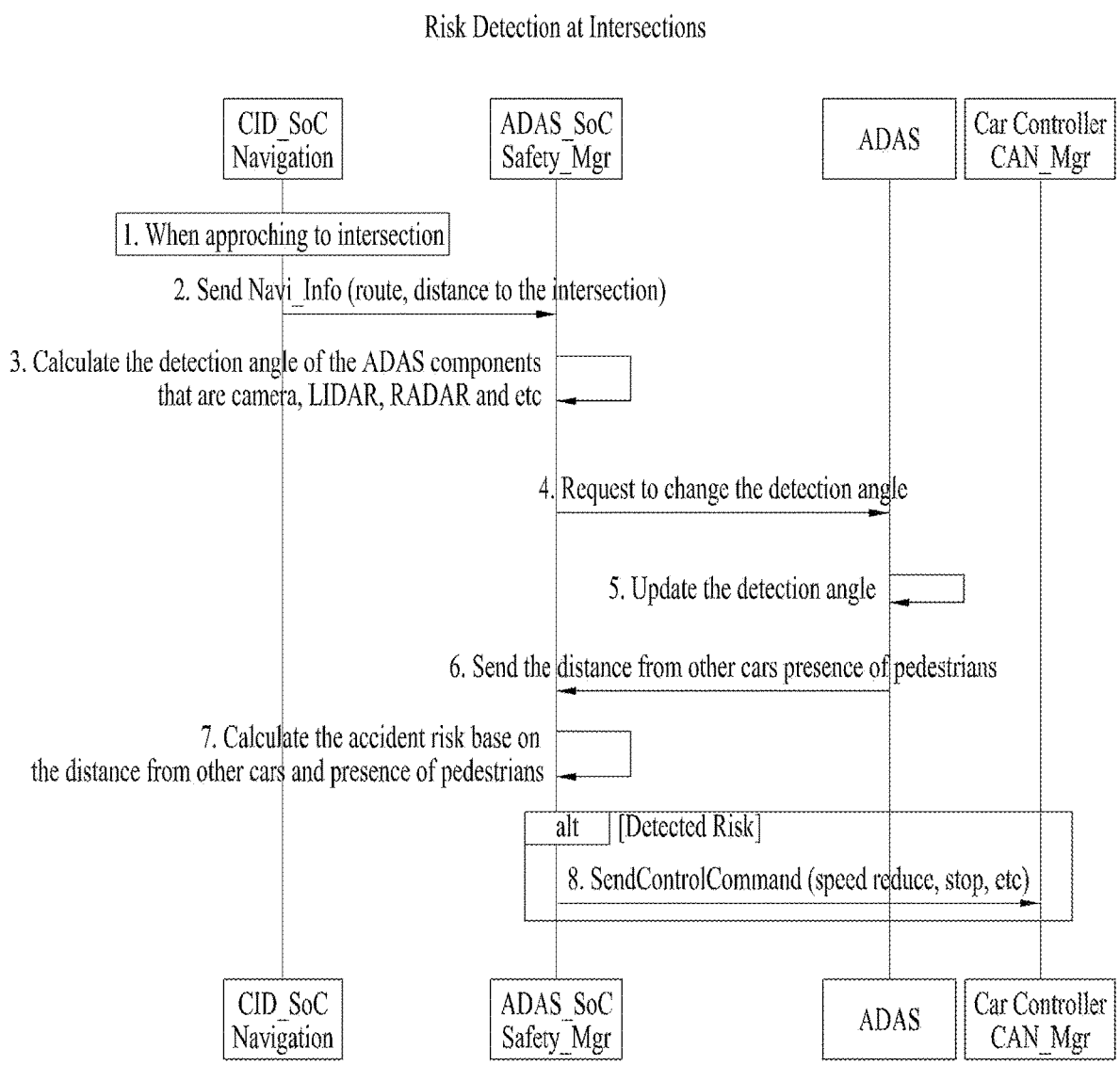
FIG. 19 is a diagram illustrating a method of controlling a vehicle by combining information of a CID SoC with information of an ADAS SoC according to a third implementation.

FIG. 19 is a diagram illustrating a method of controlling a vehicle by a combination of information of an ADAS SoC and information of a CID SoC according to a third implementation. For example, the third implementation may be applied, when the vehicle detects a potential risk during turning left or right at an intersection and thus brakes by emergency braking.

Referring to FIG. 19, the method of controlling a vehicle by a combination of information of the ADAS SoC and information of the CID SoC may be performed in the following order of i) to v).

i) When approaching an intersection during autonomous driving, the navigator of the CID SoC transmits navigation route information to the safety manager of the ADAS SoC through the agent. ii) At the same time, the safety manager of the ADAS SoC transmits a command for changing the steering angles of the lidar and the radar of the ADAS (to reduce the risk of accidents by increasing the steering angles when approaching the intersection and thus detecting vehicles approaching from the left and/or right). iii) The ADAS changes the steering angles and transmits updated information to the data provider. iv) The ADAS SoC transmits the changed ADAS information to the safety manager through the agent, and the safety manager monitors whether there is an accident risk. v) If there is a risk of an accident, the safety manager of the ADAS SoC transmits a speed decrease or brake command the car controller.

Each of the above-described steps may be performed as follows in terms of a function call and a command flow.

i) The vehicle enters an intersection; ii) the CID_SoC Navigation delivers navigation information (e.g., a route, a remaining distance to the intersection, and so on) to the ADAS_SoC; iii) the ADAS_SoC Safety Mgr receives the navigation information and calculates the monitoring angles of the Camera, RADAR, and LIDAR; iv) the ADAS_SoC Safety Mgr requests the ADAS to change the angles based on the calculated monitoring angles; v) the ADAS updates the monitoring angles according to the requested monitoring angles; vi) the ADAS indicates the distance to another vehicle and the presence or absence of a pedestrian to the ADAS_SoC Safety Mgr; vii) the ADAS_SoC Safety Mgr calculates an accident risk factor based on the received information; and viii) when the ADAS_SoC Safety Mgr detects the risk of an accident, the ADAS_SoC Safety Mgr transmits a vehicle control command (deceleration or stop) to the CAR Controller (CAN Mgr).

Multi-SoC-Based Car Controller System_Implementation 4

Figure 20:
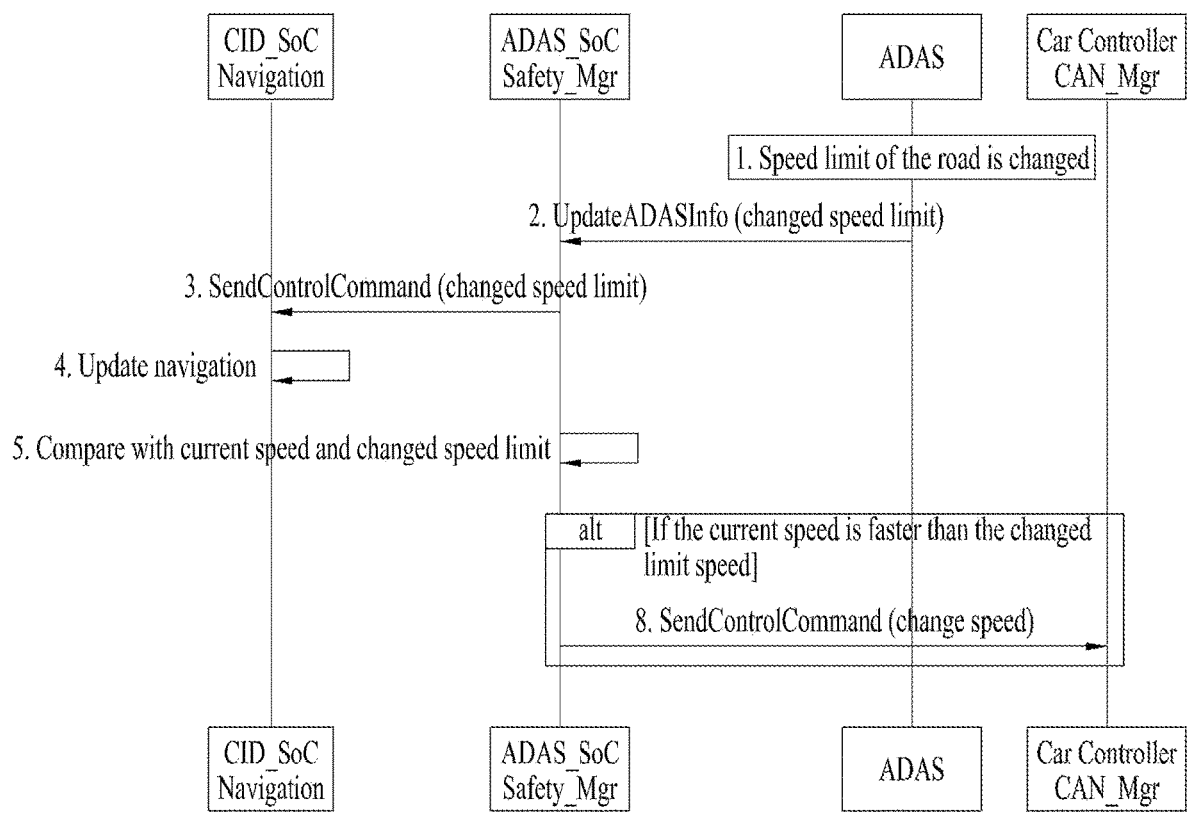
FIG. 20 is a diagram illustrating a method of controlling a vehicle by combining information of a CID SoC with information of an ADAS SoC according to a fourth implementation.

FIG. 20 is a diagram illustrating a method of controlling a vehicle by a combination of information of an ADAS SoC and information of a CID SoC according to a fourth implementation. For example, the fourth implementation may be applied when the speed of the vehicle needs to be changed during autonomous driving due to i) a change in the speed limit of a road and ii) an unexpected speed change (e.g., lane construction).

Referring to FIG. 20, a method of controlling a vehicle through a combination of information of an ADAS SoC and information of a CID SoC may be performed in the following order of i) to iii).

i) When the speed limit of a highway suddenly changes due to unexpected construction during autonomous driving on the highway with a constant speed limit, the ADAS detects the changed speed limit value by recognizing a sign. ii) The ADAS data provider transmits the changed speed limit value to the safety manager of the ADAS SoC through the agent. iii) The safety manager of the ADAS SoC compares a current driving speed with the changed speed limit value and transmits a speed decrease command to the car controller if the vehicle is overspeeding.

Each of the above-described steps may be performed as follows in terms of a function call and a command flow.

i) The ADAS detects a change in the speed limit of a road; ii) the ADAS transmits the changed speed limit value to the ADAS_SoC Agent; iii) the ADAS_SoC Safety Mgr transmits the changed speed limit value to the CID_SoC Navigation; iv) the Navigation updates the speed limit; v) the ADAS_SoC Safety Mgr compares a current driving speed with the changed speed limit value; and vi) When the current driving speed exceeds the changed speed limit value, the ADAS_SoC Safety Mgr transmits a speed change command to the Car_Controller (CAN Mgr) to decelerate.

Multi-SoC-Based Car Controller System_Implementation 5

Figure 21:
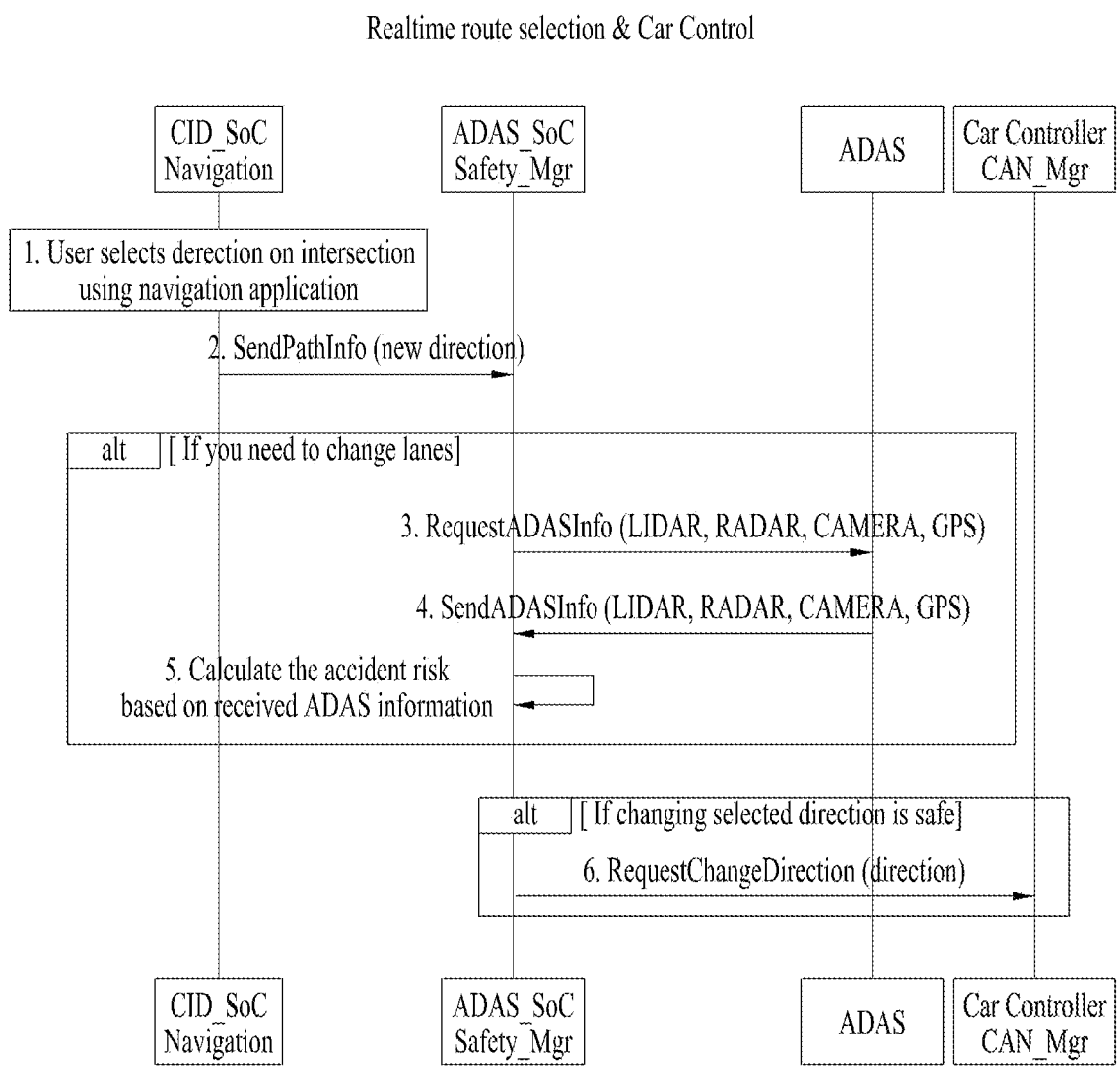
FIG. 21 is a diagram illustrating a method of controlling an ADAS and a vehicle by transmitting information generated through a user input on a CID SoC to an ADAS SoC according to a fifth implementation.

FIG. 21 is a diagram illustrating a method of controlling an ADAS and a vehicle by transmitting information generated from a user input to the ADAS SoC by the CID SoC according to a fifth implementation. In the MSCC system, i) when the vehicle approaches an intersection during autonomous driving, the navigation app of the CID SoC displays choices for a vehicle direction (e.g., turn left, turn right, or go straight). ii) When the vehicle direction is selected, information about the selected direction is transmitted to the safety manager of the ADAS SoC through the agent of each SoC. iii) The safety manager of the ADAS SoC may control the vehicle by combining the received information with ADAS information and thus determining whether it is necessary to change a lane and whether it is safe.

Referring to FIG. 21, the method of controlling the ADAS and the vehicle by transmitting information generated through a user input to the ADAS SoC by the CID SoC may be performed in the following order of i) to iv).

i) When the vehicle approaches an intersection during autonomous driving, choices for a vehicle direction (left/right/straight) are provided on the screen of the navigation app of the CID SoC. ii) When the driver selects a vehicle direction (left/right/straight), information about the selection direction (left/right/straight) is transmitted to the safety manager of the ADAS SoC through the agent of each SoC. When the driver does not select the vehicle direction or the selected direction is the same as the existing driving direction, the vehicle travels along the existing navigation path without transmitting additional information. iii) The safety manager of the ADAS SoC receives ADAS information from the ADAS data provider (e.g., information of the lidar, the radar, the camera, and the GPS), checks information about a currently driving lane, determine whether there is an accident risk due to a lane change when a lane change is necessary, and when there is no risk of an accident, transmits a lane and drive direction command to the car controller through the agent. The safety manager of the ADAS SoC checks the information about the currently driving lane from ADAS, determines whether there is an accident risk due to the lane change only when the lane change is necessary, and if there is no risk of an accident, and transmits the lane and driving direction command to the car controller through the agent. iv) At the intersection after the lane change, the safety manager of the ADAS SoC adjusts the steering angle of the ADAS to the changed direction through the agent.

Each of the above-described steps may be performed as follows in terms of a function call and a command flow.

i) The driver manipulates the Navigation to take a route different from a route provided by the Navigation at an intersection; ii) the CID_SoC Navigation transmits new route information to the ADAS_SoC; iii) the ADAS_SoC Safety Mgr requests LIDAR, RADAR, CAMERA, and GPS information to the ADAS, when a lane change is necessary; iv) the ADAS transmits the LIDAR, RADAR, CAMERA, and GPS information to the ADAS_SoC; v) the ADAS_SoC Safety Mgr calculates an accident risk factor when a lane is changed based on the received ADAS information; vi) If there is no risk of an accident, the ADAS_SoC Safety Mgr transmits a lane change command (e.g., Left, Right) to the Car_Controller (or EV-ECU).

The above embodiments of the present disclosure may be implemented in various means, for example, hardware, firmware, software, or a combination thereof.

In a hardware configuration, the methods according to embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In a firmware or software configuration, the methods according to the embodiments of the present disclosure may be implemented in the form of a module, a procedure, a function, or the like. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

In addition, both the product invention and the method invention are described herein, and the description of both inventions may be applied supplementarily when needed.

Various embodiments have been described in the best mode for carrying out the disclosure.

The above description should not be construed as restrictive in all respects. Rather, it should be considered as illustrative. The scope of the present disclosure should be determined by rational interpretation of the appended claims, and all changes within the equivalent scope of the present disclosure fall within the scope of the present disclosure.

The present disclosure described above may be implemented as a computer-readable code on a medium on which a program is recorded. The computer-readable medium includes all types of recording devices that store data readable by a computer system. Examples of the computer-readable medium includes hard disk drive (HDD), solid state disk (SSD), silicon disk drive (SDD), ROM, RAM, CD-ROM, magnetic tape, floppy disk, optical data storage device, and carrier wave (e.g., transmission over the Internet). In addition, the computer may include a controller 180 of a terminal. Therefore, the detailed description above should not be construed as restrictive in all respects and should be considered as illustrative. The scope of the present disclosure should be determined by rational interpretation of the appended claims, and all changes within the equivalent scope of the present disclosure fall within the scope of the present disclosure.

What is claimed is:

1. A method of controlling a vehicle in a multi-system-on-chip (multi-SoC) system, the method comprising:
   requesting, by a first SoC, information to a second SoC or an advanced driver assistance system (ADAS);
   receiving, by the first SoC, the information from the second SoC or the ADAS in response to the request;
   determining, by the first SoC, whether a safety level of the vehicle is at or below a specific level based on the received information;
   transmitting, to the second SoC or the ADAS, a command generated based on the determination by the first SoC;
   detecting, by the second SoC, that the vehicle is disconnected from a network;
   requesting, to the first SoC, information regarding a position, speed, and a driving lane of the vehicle by the second SoC; and
   receiving, from the first SoC, the information regarding the position, the speed, and the driving lane of the vehicle in response to the request by the second SoC.

2. The method according to claim 1, wherein the first SoC and the second SoC are connected to each other through peripheral component interconnect express (PCIe), and the first SoC and the ADAS are connected to each other through a control area network (CAN).

3. The method according to claim 1, wherein a data packet used for the information request and reception includes command, payload length, number of elements, data payload, and end character, and
   wherein a size of the data payload varies according to a type of each data field being string or non-string, the type being related to the requested and received information.

4. The method according to claim 1, wherein, based on failure of the first SoC to receive the information for a specific time or longer from the second SoC or the ADAS, the first SoC is configured to transmit, to the second SoC or the ADAS, a message indicating that the request of the information is valid.

5. The method according to claim 1, wherein, based on a determination that the safety level of the vehicle is at or below the specific level, the first SoC is configured to transmit, to the second SoC, a message indicating that the safety level of the vehicle is at or below the specific level, and the second SoC is configured to output the received message on a display device connected to the second SoC.

6. A multi-system-on-chip (multi-SoC) system for controlling a vehicle, comprising:
   a first SoC;
   a second SOC; and
   an advanced driver assistance system (ADAS),
   wherein the first SoC is configured to:
      request information to the second SoC or the ADAS,
      receive the information from the second SoC or the ADAS in response to the request,
      determine whether a safety level of the vehicle is at or below a specific level based on the received information, and
      transmit, to the second SoC or the ADAS, a command generated based on the determination, and
   wherein the second SoC is configured to:
      detect that the vehicle is disconnected from a network,
      request, to the first SoC, information regarding a position, speed, and a driving lane of the vehicle, and
      receive, from the first SoC, the information regarding the position, the speed, and the driving lane of the vehicle in response to the request by the second SoC.

7. The multi-SoC system according to claim 6, wherein the first SoC and the second SoC are connected to each other through peripheral component interconnect express (PCIe), and the first SoC and the ADAS are connected to each other through a control area network (CAN).

8. The multi-SoC system according to claim 6, wherein a data packet used for the information request and reception includes command, payload length, number of elements, data payload, and end character, and
   wherein a size of the data payload varies according to a type of each data being string or non-string, the type being related to the requested and received information.

9. The multi-SoC system claim 6, wherein, based on failure of the first SoC to receive the information for a specific time or longer from the second SoC or the ADAS, the first SoC is configured to transmit, to the second SoC or the ADAS, a message indicating that the request of the information is valid.

10. The multi-SoC system according to claim 6, wherein, based on a determination that the safety level of the vehicle is at or below the specific level, the first SoC is configured to transmit, to the second SoC, a message indicating that the safety level of the vehicle is at or below the specific level, and the second SoC is configured to output the received message on a display device connected to the second SoC.

\* \* \* \* \*